(12) United States Patent
Kudo

(10) Patent No.: US 11,257,666 B2
(45) Date of Patent: Feb. 22, 2022

(54) TIME-OF-FLIGHT MASS SPECTROMETER

(71) Applicant: SHIMADZU CORPORATION, Kyoto (JP)

(72) Inventor: Tomoya Kudo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/049,382

(22) PCT Filed: May 14, 2018

(86) PCT No.: PCT/JP2018/018530
§ 371 (c)(1),
(2) Date: Oct. 21, 2020

(87) PCT Pub. No.: WO2019/220497
PCT Pub. Date: Nov. 21, 2019

(65) Prior Publication Data
US 2021/0249248 A1    Aug. 12, 2021

(51) Int. Cl.
*H01J 49/40*     (2006.01)
*H01J 49/00*     (2006.01)
*H01J 49/04*     (2006.01)

(52) U.S. Cl.
CPC ........ *H01J 49/405* (2013.01); *H01J 49/0009* (2013.01); *H01J 49/0486* (2013.01)

(58) Field of Classification Search
CPC ...... H01J 49/0009; H01J 49/40; H01J 49/405; H01J 49/0486
See application file for complete search history.

(56) References Cited

U.S. PATENT DOCUMENTS 6,465,777 B1 * 10/2002 Rache ................. H01J 49/40
                                                    250/281
6,700,118 B2 * 3/2004 Yefchak ............ H01J 49/0009
                                                    250/287
(Continued)

FOREIGN PATENT DOCUMENTS

JP    2006-140064 A    6/2006
JP    2017-059385 A    3/2017

OTHER PUBLICATIONS

Written Opinion of PCT/JP2018/018530 dated Aug. 7, 2018 [PCT/ISA/237].
(Continued)

*Primary Examiner* — Wyatt A Stoffa
(74) *Attorney, Agent, or Firm* — Sughrue Mion, PLLC

(57) ABSTRACT

A flight tube 246 is hollow, and ions emitted from an ion emission unit are introduced into the flight tube 246. A reflectron 244 is provided in the flight tube 246, and is configured by coaxially arranging a plurality of annular electrodes 244A and 244B. A vacuum vessel 247A that becomes in a vacuum state during analysis is formed in the vacuum chamber 247, and the flight tube 246 is provided in the vacuum vessel 247A. A temperature control mechanism 248 controls a temperature of the flight tube 246. An ambient temperature sensor 250 detects an ambient temperature outside the vacuum chamber 247. A target temperature of the temperature control mechanism 248 is set on the basis of the ambient temperature detected by the ambient temperature sensor 250.

4 Claims, 2 Drawing Sheets

(56) References Cited

U.S. PATENT DOCUMENTS

| | | | |
|---|---|---|---|
| 6,998,607 B1* | 2/2006 | Davis | H01J 49/40 250/287 |
| 7,183,543 B1* | 2/2007 | Overney | H01J 49/40 250/287 |
| 8,013,293 B2* | 9/2011 | Yamauchi | H01J 49/40 250/287 |
| 10,593,531 B2* | 3/2020 | Mizutani | H01J 49/40 |
| 10,991,566 B2* | 4/2021 | Kudo | H01J 49/24 |
| 2003/0034448 A1* | 2/2003 | Yefchak | H01J 49/40 250/282 |
| 2004/0031918 A1* | 2/2004 | Schoen | H05K 1/0212 250/282 |
| 2006/0043283 A1* | 3/2006 | Davis | H01J 49/40 250/287 |
| 2010/0176292 A1* | 7/2010 | Yamauchi | H01J 49/40 250/287 |
| 2012/0068064 A1* | 3/2012 | Numata | H01J 49/40 250/287 |
| 2016/0365235 A1* | 12/2016 | Chiappetta | H01J 49/40 |
| 2018/0012740 A1* | 1/2018 | Shimomura | H01J 49/0009 |
| 2018/0358215 A1* | 12/2018 | Yamaguchi | H01J 49/0009 |

OTHER PUBLICATIONS

International Search report of PCT/JP2018/018530 dated Aug. 7, 2018 [PCT/ISA/210].
Extended European Search Report dated Nov. 23, 2021, issued by the European Patent Office in application No. 18918627.3.

* cited by examiner

TIME-OF-FLIGHT MASS SPECTROMETER

CROSS REFERENCE TO RELATED APPLICATIONS

This application is a National Stage of International Application No. PCT/JP2018/018530 filed on May 14, 2018, the disclosure of which is incorporated herein in its entirely by reference.

TECHNICAL FIELD

The present invention relates to a time-of-flight mass spectrometer including a hollow flight tube into which ions emitted from an ion emission unit are introduced.

BACKGROUND ART

In a time-of-flight mass spectrometer (TOFMS), ions to be analyzed are emitted from an ion emission unit, and the ions fly in a hollow flight tube and then are detected by a detector. As a result, the time of flight of the ion until the ion reaches the detector is measured, and the mass-to-charge ratio m/z of the ion is calculated on the basis of the time of flight (refer to, for example, Patent Document 1).

The flight tube is formed of metal. Therefore, when the temperature (ambient temperature) in the vicinity of the flight tube is changed, the flight tube thermally expands or contracts to cause fluctuation of the time of flight of the ion in the flight tube, and thereby the measurement accuracy becomes poor, which is a problem.

Therefore, by controlling the temperature of the flight tube, it is generally performed to keep the flight tube at a constant temperature even in a case where the ambient temperature is changed. In this case, a target temperature when controlling the temperature of the flight tube is set to a constant temperature (for example, 45° C.).

PRIOR ART DOCUMENT

Patent Document

Patent Document 1: Japanese Patent Laid-Open No. 2017-59385

SUMMARY OF THE INVENTION

Problems to be Solved by the Invention

However, in a case where the temperature of the flight tube is controlled at a constant target temperature, for example, when the ambient temperature is low such as in winter, more power is required. Therefore, there is a problem in that wasteful power is required and running cost becomes high.

Further, since the ambient temperature may be greatly changed depending on the environment in which the device is installed, it is required to use a high output heater applicable to a wide range of ambient temperatures. Therefore, in addition to the increase in manufacturing cost, there is a problem in that there is a risk of fire and the safety is deteriorated in a case where the heater is continuously driven at the maximum output due to a failure or the like.

On the other hand, in a case where a low output heater is used to avoid the above problem, such a low output heater is applicable only to a narrow range of ambient temperatures. In this case, it is required to take measures such as adjusting the ambient temperature by air conditioning, and in an environment where such air conditioning cannot be performed, the device performance cannot be sufficiently exhibited, which is a problem.

Further, in a case where the ambient temperature is low such as in winter, since it takes time for the temperature of the flight tube to stabilize at the target temperature when activating the device, the waiting time until the analysis is started becomes long. As described above, there is a problem that the waiting time until the analysis is started varies depending on the ambient temperature.

Further, there is a problem that the greater the difference between the target temperature for temperature control and the ambient temperature, the greater the temperature gradient (temperature unevenness) generated in the flight tube to be temperature controlled.

The invention has been made in view of the above circumstances, and an object of the invention is to provide a time-of-flight mass spectrometer that can reduce running costs.

Another object of the invention is to provide a time-of-flight mass spectrometer that can improve safety.

Further, still another object of the invention is to provide a time-of-flight mass spectrometer that can sufficiently exhibit the device performance even in a case of being applied to a wide range of ambient temperatures.

Further, still another object of the invention is to provide a time-of-flight mass spectrometer that is less likely to cause variations in waiting time until the analysis is started.

Further, still another object of the invention is to provide a time-of-flight mass spectrometer that can reduce a temperature gradient generated in the flight tube to be temperature controlled.

Means for Solving the Problems (1) A time-of-flight mass spectrometer according to the invention includes an ion emission unit, a flight tube, a reflectron, a vacuum chamber, a temperature control mechanism, and an ambient temperature sensor. The ion emission unit emits ions to be analyzed. The flight tube is hollow, and the ions emitted from the ion emission unit are introduced into the flight tube. The reflectron is provided in the flight tube, and is configured by coaxially arranging a plurality of annular electrodes. A vacuum vessel that becomes in a vacuum state during analysis is formed in the vacuum chamber, and the flight tube is provided in the vacuum vessel. The temperature control mechanism controls a temperature of the flight tube. The ambient temperature sensor detects an ambient temperature outside the vacuum chamber. A target temperature of the temperature control mechanism is set on the basis of the ambient temperature detected by the ambient temperature sensor.

With the configuration, the ambient temperature outside the vacuum chamber can be detected by the ambient temperature sensor, and the temperature of the flight tube can be controlled at the target temperature that is set on the basis of the ambient temperature. Therefore, the running cost can be reduced by setting the target temperature to be low when the ambient temperature is low.

Since the target temperature of the temperature control mechanism is set on the basis of the ambient temperature, the device can be applied to a wide range of ambient temperatures even with a low output heater. Therefore, even in a case where the heater is continuously driven at the maximum output due to a failure or the like, the risk of fire is low and the safety can be improved.

Further, even in a case where the device is applied to a wide range of ambient temperatures, the device performance can be sufficiently exhibited by using a low output heater without adjusting the ambient temperature by air conditioning.

Since the target temperature of the temperature control mechanism is set on the basis of the ambient temperature, the time required for the temperature of the flight tube to stabilize at the target temperature can be made substantially constant by setting the target temperature to be low when the ambient temperature is low. This makes it possible to prevent variations in the waiting time until the analysis is started.

Since the difference between the ambient temperature and the target temperature of the temperature control mechanism can be reduced regardless of the ambient temperature, the temperature gradient generated in the flight tube to be temperature controlled can be reduced.

(2) The time-of-flight mass spectrometer may further include a target temperature setting processing unit that automatically sets the target temperature of the temperature control mechanism on the basis of the ambient temperature detected by the ambient temperature sensor.

With the configuration, since the target temperature of the temperature control mechanism is automatically set by the target temperature setting processing unit on the basis of the ambient temperature, it is possible to prevent the target temperature from being set incorrectly. Therefore, the target temperature can always be set to an appropriate temperature.

(3) The target temperature setting processing unit may automatically set the target temperature of the temperature control mechanism by adding or subtracting a constant value to or from the ambient temperature detected by the ambient temperature sensor.

With the configuration, the target temperature of the temperature control mechanism is automatically set such that the difference between the ambient temperature and the target temperature of the temperature control mechanism is always constant. Therefore, the waiting time until the analysis is started becomes substantially constant, and the temperature gradient generated in the flight tube to be temperature controlled also becomes substantially constant.

Effects of the Invention

According to the invention, the running costs can be reduced by setting the target temperature low when the ambient temperature is low.

Further, according to the invention, even in a case where the heater is continuously driven at the maximum output due to a failure or the like, the risk of fire is low and the safety can be improved.

Further, according to the invention, even in a case where the device is applied to a wide range of ambient temperatures, the device performance can be sufficiently exhibited by using a low output heater without adjusting the ambient temperature by air conditioning.

Further, according to the invention, since the time until the temperature of the flight tube stabilizes at the target temperature can be made substantially constant, it is possible to make variations in waiting time until the analysis is started less likely to occur.

Further, according to the invention, since the difference between the ambient temperature and the target temperature of the temperature control mechanism can be reduced regardless of the ambient temperature, the temperature gradient generated in the flight tube to be temperature controlled can be reduced.

MODE FOR CARRYING OUT THE INVENTION

1. Overall Configuration of Liquid Chromatograph Mass Spectrometer

Figure 1:
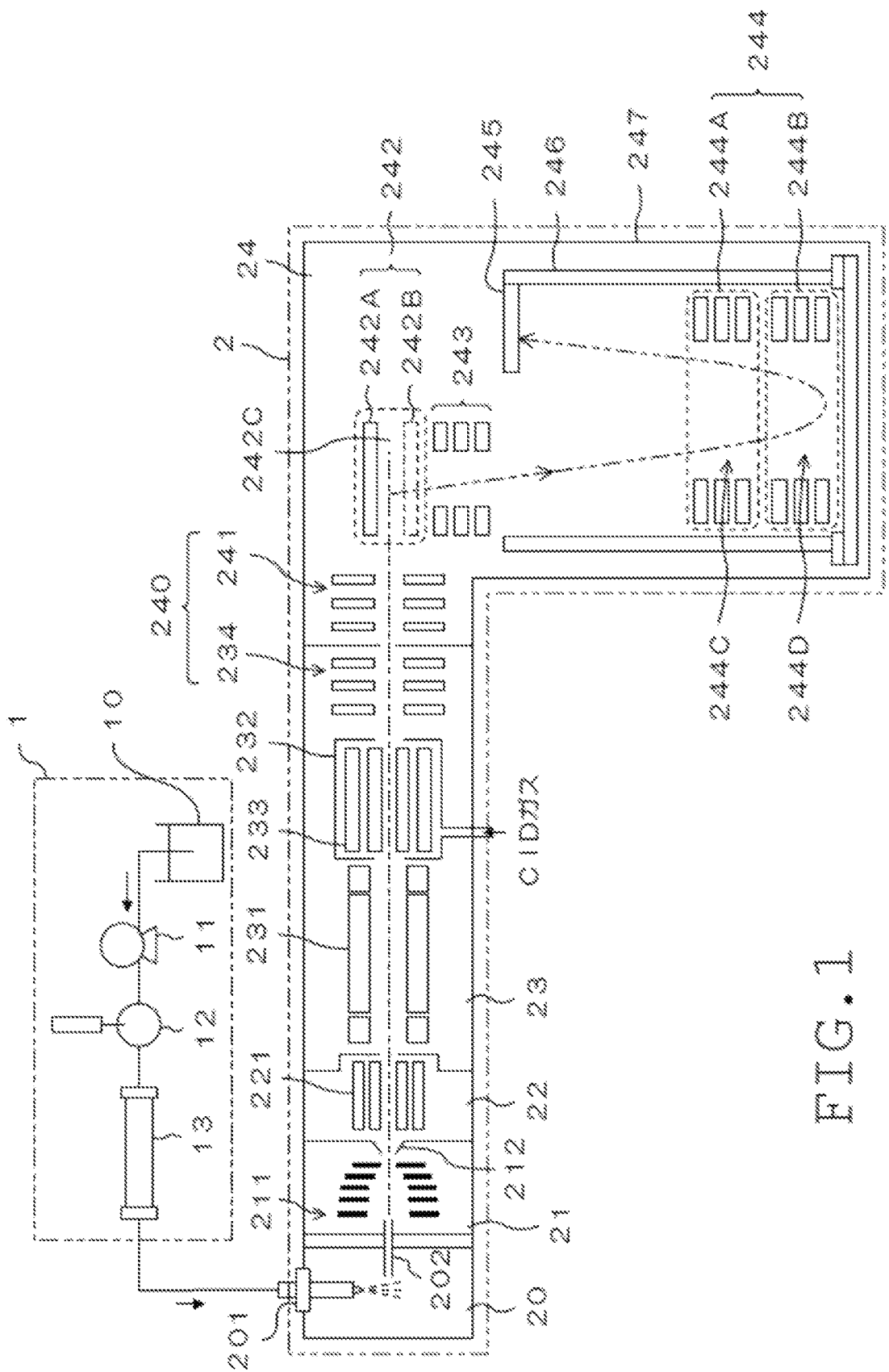
FIG. 1 is a schematic diagram illustrating a configuration example of a liquid chromatograph mass spectrometer including a time-of-flight mass spectrometer according to an embodiment of the invention.

FIG. 1 is a schematic diagram illustrating a configuration example of a liquid chromatograph mass spectrometer including a time-of-flight mass spectrometer according to an embodiment of the invention. The liquid chromatograph mass spectrometer includes a liquid chromatograph unit 1 and a mass spectrometer unit 2.

The liquid chromatograph unit 1 includes a mobile phase container 10, a pump 11, an injector 12, a column 13, and the like. A mobile phase is stored in the mobile phase container 10. The pump 11 sends out the mobile phase in the mobile phase container 10 to the injector 12. In the injector 12, a predetermined amount of sample is injected into the mobile phase from the mobile phase container 10. The mobile phase into which the sample is injected is introduced into the column 13, and respective components in the sample are separated in the course of passing through the column 13. The respective components in the sample separated by the column 13 are sequentially supplied to the mass spectrometer unit 2.

The mass spectrometer unit 2 is composed of a time-of-flight mass spectrometer (TOFMS), and an ionization chamber 20, a first intermediate chamber 21, a second intermediate chamber 22, a third intermediate chamber 23, an analysis chamber 24, and the like are formed inside the mass spectrometer unit 2. The inside of the ionization chamber 20 is substantially at atmospheric pressure. The first intermediate chamber 21, the second intermediate chamber 22, the third intermediate chamber 23, and the analysis chamber 24 are brought into a vacuum state (negative pressure state) by driving a vacuum pump (not illustrated). The ionization chamber 20, the first intermediate chamber 21, the second intermediate chamber 22, the third intermediate chamber 23, and the analysis chamber 24 are in communication with each other, and are configured such that the degree of vacuum is gradually increased in this order.

The ionization chamber 20 is provided with a spray 201 such as an electro spray ionization (ESI) spray. The sample liquid containing respective components in the sample supplied from the liquid chromatograph unit 1 is sprayed into the ionization chamber 20 by the spray 201 while being charged. As a result, ions derived from the respective components in the sample are generated. However, the ionization method used in the mass spectrometer unit 2 is not limited to the ESI, and other ionization methods such as atmospheric pressure chemical ionization (APCI) or probe electro spray ionization (PEST) may be used.

The first intermediate chamber 21 communicates with the ionization chamber 20 via a heating capillary 202 composed of a small-diameter tube. Further, the second intermediate chamber 22 communicates with the first intermediate chamber 21 via a skimmer 212 composed of a small hole. The first intermediate chamber 21 and the second intermediate chamber 22 are respectively provided with ion guides 211 and 221 each of which is for focusing the ions and sending the ions to the subsequent stage.

The third intermediate chamber 23 is provided with, for example, a quadrupole mass filter 231 and a collision cell 232. A collision induced dissociation (CID) gas such as argon or nitrogen is continuously or intermittently supplied to the inside of the collision cell 232. A multipole ion guide 233 is provided in the collision cell 232.

The ions flowing from the second intermediate chamber 22 to the third intermediate chamber 23 are separated by the quadrupole mass filter 231 according to the mass-to-charge ratio, and only the ions having a specific mass-to-charge ratio pass through the quadrupole mass filter 231. The ions that have passed through the quadrupole mass filter 231 are introduced into the collision cell 232 as precursor ions, and are brought into contact with the CID gas to be cleaved to generate product ions. The generated product ions are temporarily held by the multipole ion guide 233, and emitted from the collision cell 232 at a predetermined timing.

A transfer electrode unit 240 is provided in the third intermediate chamber 23 and the analysis chamber 24 so as to straddle the chambers. The transfer electrode unit 240 includes one or a plurality of first electrodes 234 provided in the third intermediate chamber 23 and one or a plurality of second electrodes 241 provided in the analysis chamber 24. The first electrode 234 and the second electrode 241 are each formed in an annular shape and are coaxially arranged. The ions (product ions) emitted from the collision cell 232 are focused by passing through the inside the plurality of electrodes 234 and 241 in the transfer electrode unit 240.

In addition to the second electrode 241, an orthogonal acceleration unit 242, an acceleration electrode unit 243, a reflectron 244, a detector 245, a flight tube 246, and the like are provided in the analysis chamber 24. The flight tube 246 is, for example, a hollow member of which both ends are open, and the reflectron 244 is arranged inside the flight tube 246.

The ions enter the orthogonal acceleration unit 242 from the transfer electrode unit 240. The orthogonal acceleration unit 242 includes a pair of electrodes 242A and 242B facing each other with a space therebetween. The pair of electrodes 242A and 242B extends parallel to the entering direction of the ions from transfer electrode unit 240, and an orthogonal acceleration region 242C is formed between the electrodes 242A and 242B.

One electrode 242B is composed of a grid electrode having a plurality of openings. The ions that enter the orthogonal acceleration region 242C are accelerated in a direction orthogonal to the entering direction of the ions, pass through the openings of one electrode 242B, and are guided to the acceleration electrode unit 243. In the present embodiment, the orthogonal acceleration unit 242 constitutes an ion emission unit that emits ions to be analyzed. The ions emitted from the orthogonal acceleration unit 242 are further accelerated by the acceleration electrode unit 243, and are introduced into the flight tube 246.

The reflectron 244 provided in the flight tube 246 includes one or a plurality of first electrodes 244A and one or a plurality of second electrodes 244B. The first electrode 244A and the second electrode 244B are each formed in an annular shape and are coaxially arranged along the axis of the flight tube 246. Different voltages are applied to the first electrode 244A and the second electrode 244B, respectively.

The ions introduced into the flight tube 246 are guided into a flight space formed in the flight tube 246, fly into the flight space, and then enter the detector 245. Specifically, the ions introduced into the flight tube 246 are folded back into a U shape to enter the detector 245 by being decelerated in a first region (first stage) 244C formed in the first electrode 244A, and then being reflected in a second region (second stage) 244D formed in the second electrode 244B.

The time of flight from when the ion is emitted from the orthogonal acceleration unit 242 to when the ion enters the detector 245 depends on the mass-to-charge ratio of the ions. Therefore, the mass-to-charge ratio of each ion can be calculated based on the time of flight of each ion emitted from the orthogonal acceleration unit 242, and the mass spectrum can be created.

2. Specific Configuration around Flight Tube

Figure 2:
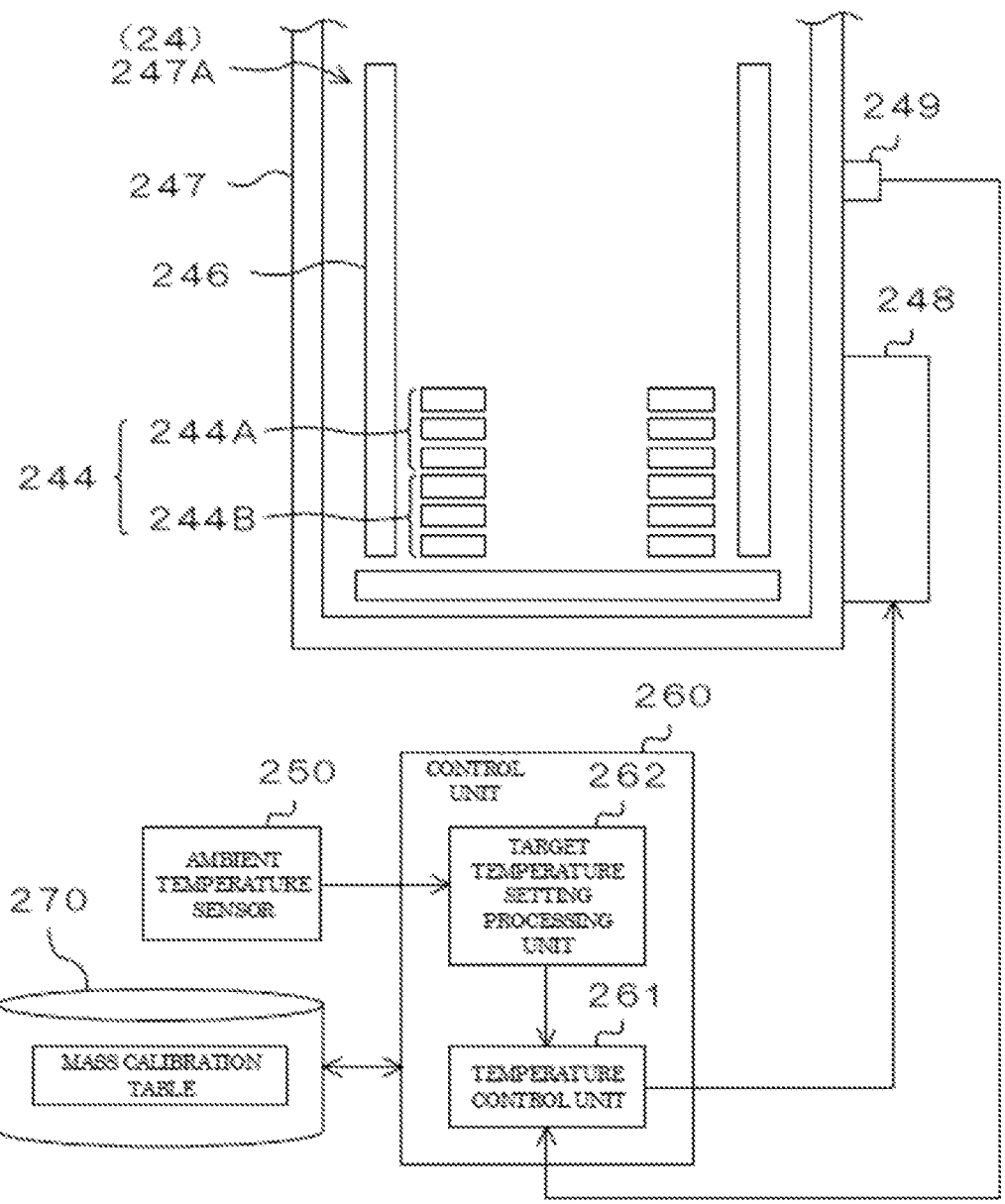
FIG. 2 is a schematic diagram illustrating a specific configuration around a flight tube.

FIG. 2 is a schematic diagram illustrating a specific configuration around the flight tube 246. The flight tube 246 is provided in a vacuum chamber 247. A vacuum vessel 247A that becomes in a vacuum state during analysis is formed in the vacuum chamber 247, and the flight tube 246 is provided in the vacuum vessel 247A. In the present embodiment, the vacuum vessel 247A is the above-mentioned analysis chamber 24.

A temperature control mechanism 248 is attached to the wall surface of the vacuum chamber 247 from the outside. The temperature control mechanism 248 includes, for example, a heater (not illustrated), and controls the temperature inside the vacuum vessel 247A by heating the vacuum chamber 247 from the outside. As a result, the temperature of the flight tube 246 in the vacuum chamber 247 is indirectly controlled. However, the temperature control mechanism 248 may be configured not only to indirectly heat the flight tube 246 but also to cool the flight tube 246. Further, the temperature control mechanism 248 is not limited to the configuration of indirectly controlling the temperature of the flight tube 246, and may be configured to directly control the temperature of the flight tube 246.

A temperature sensor 249 is attached to the wall surface of the vacuum chamber 247 from the outside. The temperature sensor 249 indirectly detects the temperature in the vacuum vessel 247A, more specifically, the temperature of the flight tube 246 in the vacuum vessel 247A, by detecting the temperature of the wall surface of the vacuum chamber 247. However, the temperature sensor 249 is not limited to the configuration of indirectly detecting the temperature of the flight tube 246, but may be configured to directly detect the temperature of the flight tube 246.

A high voltage is applied to the flight tube 246. Therefore, it is difficult to directly attach the temperature control mechanism 248 and the temperature sensor 249 to the flight tube 246. Therefore, it is preferable that the temperature of the flight tube 246 is indirectly detected by the temperature sensor 249 and the temperature of the flight tube 246 is indirectly controlled by the temperature control mechanism 248 as in the present embodiment.

An ambient temperature sensor 250 is provided outside the vacuum chamber 247 at a position where the ambient temperature sensor 250 is not in contact with the vacuum chamber 247. The ambient temperature sensor 250 detects the temperature (ambient temperature) around the device by detecting the temperature in the room where the liquid chromatograph mass spectrometer is installed. The ambient temperature sensor 250 is preferably provided near the liquid chromatograph mass spectrometer, especially near the mass spectrometer unit 2.

The liquid chromatograph mass spectrometer includes a control unit 260 including a central processing unit (CPU), for example. The control unit 260 functions as a temperature control unit 261 and a target temperature setting processing unit 262 by the CPU executing a program.

The temperature control unit 261 controls the operation of the temperature control mechanism 248 on the basis of the preset target temperature. Specifically, the energization state of the heater provided in the temperature control mechanism 248 is controlled by the temperature control unit 261. The temperature control unit 261 performs feedback control on the temperature control mechanism 248 so that the temperature detected by the temperature sensor 249 approaches the target temperature.

The target temperature setting processing unit 262 automatically sets the target temperature of the temperature control mechanism 248 on the basis of the ambient temperature detected by the ambient temperature sensor 250. Specifically, the target temperature setting processing unit 262 automatically sets the target temperature of the temperature control mechanism 248 by adding a constant value to the ambient temperature detected by the ambient temperature sensor 250. As a result, the operation of the temperature control mechanism 248 is controlled so that the temperature detected by the temperature sensor 249 is higher than the ambient temperature by a constant value. The constant value is, for example, in a range of 16° C. to 30° C., preferably about 20° C.

In this way, since the target temperature is set based on the ambient temperature detected by the ambient temperature sensor 250, the target temperature is set relatively low when the ambient temperature is low such as in winter, and the target temperature is set relatively high when the ambient temperature is high such as in summer. That is, the lower the ambient temperature, the lower the target temperature is set, and the higher the ambient temperature, the higher the target temperature is set.

However, as long as the target temperature of the temperature control mechanism 248 is set on the basis of the ambient temperature detected by the ambient temperature sensor 250, the target temperature can be set by any calculation without being limited to a configuration in which the target temperature is set by adding a constant value to the ambient temperature. In a case of a configuration in which the temperature control mechanism 248 cools the flight tube 246, the target temperature setting processing unit 262 can set the target temperature by any calculation such as setting the target temperature by subtracting a constant value from the ambient temperature detected by the ambient temperature sensor 250.

Further, without being limited to a configuration in which the target temperature is automatically set by the target temperature setting processing unit 262, a configuration may be adopted in which a service engineer or the like who has checked the ambient temperature detected by the ambient temperature sensor 250 can manually set the target temperature. In this case, the liquid chromatograph mass spectrometer may include a display for displaying the ambient temperature detected by the ambient temperature sensor 250 and an operation unit for setting the target temperature of the temperature control mechanism 248.

When the temperature control of the flight tube 246 is executed in a state where the target temperature of the temperature control mechanism 248 is changed, the flight tube 246 thermally expands or contracts, so that the time of flight of the ion flying in the flight tube 246 is changed. Usually, the calculation of the mass-to-charge ratio of the ion based on the measured time of flight of the ion is executed on the basis of a mass calibration table created in advance. The liquid chromatograph mass spectrometer according to the present embodiment includes a mass calibration table storage unit 270 that stores the mass calibration table.

The mass calibration table is created by performing a preliminary measurement using a standard sample in which it is known that ions having a predetermined mass-to-charge ratio are observed. In the preliminary measurement, the time of flight of the ion generated from the standard sample is measured, and the mass calibration table is created by associating the measured time of flight with a predetermined mass-to-charge ratio.

The mass calibration table storage unit 270 stores a mass calibration table according to the set target temperature. As a result, even in a case where the target temperature of the temperature control mechanism 248 is changed, by using the mass calibration table corresponding to the changed target temperature, the mass-to-charge ratio of the ions observed by the TOFMS can be prevented from being changed. The mass calibration table storage unit 270 may store a mass calibration table corresponding to one target temperature, and update the mass calibration table by performing the preliminary measurement each time the target temperature is changed, or a plurality of mass calibration tables may be created in advance by performing preliminary measurements at a plurality of target temperatures, and the plurality of mass calibration tables may be stored in the mass calibration table storage unit 270.

3. Effects (1) In the present embodiment, the ambient temperature outside the vacuum chamber 247 can be detected by the ambient temperature sensor 250, and the temperature of the flight tube 246 can be controlled at the target temperature that is set on the basis of the ambient temperature. Therefore, the running cost can be reduced by setting the target temperature to be low when the ambient temperature is low.

(2) Since the target temperature of the temperature control mechanism 248 is set on the basis of the ambient temperature, the device can be applied to a wide range of ambient temperatures even with a low output heater. Therefore, even in a case where the heater is continuously driven at the maximum output due to a failure or the like, the risk of fire is low and the safety can be improved.

(3) Further, even in a case where the device is applied to a wide range of ambient temperatures, the device performance can be sufficiently exhibited by using a low output heater without adjusting the ambient temperature by air conditioning.

(4) Since the target temperature of the temperature control mechanism 248 is set on the basis of the ambient temperature, the time required for the temperature of the flight tube 246 to stabilize at the target temperature can be made substantially constant by setting the target temperature to be low when the ambient temperature is low. This makes it possible to prevent variations in the waiting time until the analysis is started.

(5) Since the difference between the ambient temperature and the target temperature of the temperature control mechanism 248 can be reduced regardless of the ambient temperature, the temperature gradient generated in the flight tube 246 to be temperature controlled can be reduced.

(6) In the present embodiment, since the target temperature of the temperature control mechanism 248 is automatically set by the target temperature setting processing unit 262 on the basis of the ambient temperature, it is possible to prevent the target temperature from being set incorrectly. Therefore, the target temperature can always be set to an appropriate temperature.

(7) In the present embodiment, the target temperature of the temperature control mechanism 248 is automatically set such that the difference between the ambient temperature and the target temperature of the temperature control mechanism 248 is always constant. Therefore, the waiting time until the analysis is started becomes substantially constant, and the temperature gradient generated in the flight tube 246 to be temperature controlled also becomes substantially constant.

4. Modification

In the above embodiment, the case where the ion emission unit that emits the ions to be analyzed is configured by the orthogonal acceleration unit 242 has been described. However, the invention is not limited to the orthogonal acceleration time-of-flight mass spectrometer, and can be applied to a linear acceleration time-of-flight analyzer.

Further, the time-of-flight mass spectrometer according to the invention is not limited to the one configured as a liquid chromatograph mass spectrometer by being connected to the liquid chromatograph unit 1, and may be configured so as not to be connected to the liquid chromatograph unit 1 such as a configuration using, for example, matrix assisted laser desorption/ionization (MALDI).

DESCRIPTION OF REFERENCE SIGNS

1 liquid chromatograph unit
2 mass spectrometer unit
242 orthogonal acceleration unit
244 reflectron
244A first electrode
244B second electrode
246 flight tube
247 vacuum chamber
247A vacuum vessel
248 temperature control mechanism
249 temperature sensor
250 ambient temperature sensor
260 control unit
261 temperature control unit
262 target temperature setting processing unit
270 mass calibration table storage unit

The invention claimed is:

1. A time-of-flight mass spectrometer comprising:
an ion emitter that emits ions to be analyzed;
a hollow flight tube into which the ions emitted from the ion emitter unit are introduced;
a reflectron that is provided in the flight tube, the reflectron comprising a plurality of coaxial annular electrodes;
a vacuum chamber comprising a vacuum vessel that is configured to be in a vacuum state during analysis, wherein the flight tube is provided in the vacuum vessel;
a temperature sensor that detects the temperature of the flight tube;
a heater that heats the flight tube;
a temperature controller that controls an output of the heater so that the temperature detected by the temperature sensor approaches a target temperature;
an ambient temperature sensor that detects an ambient temperature outside the vacuum chamber; and
a target temperature setting processor connected to the ambient temperature sensor, the target temperature setting processor is configured to set the target temperature based on the ambient temperature detected by the ambient temperature sensor.

2. The time-of-flight mass spectrometer according to claim 1:
wherein the target temperature setting processor is configured to automatically set the target temperature.

3. The time-of-flight mass spectrometer according to claim 2,
wherein the target temperature setting processor is configured to automatically set the target temperature by adding or subtracting a constant value to or from the ambient temperature detected by the ambient temperature sensor.

4. The time-of-flight mass spectrometer according to claim 1, further comprising:
a memory that stores a mass calibration table in which time of flight of an ion is associated with a mass-to-charge ratio,
wherein the mass calibration table is associated with the target temperature.

* * * * *